US010740558B2

(12) United States Patent
Ukrainets et al.

(10) Patent No.: US 10,740,558 B2
(45) Date of Patent: Aug. 11, 2020

(54) TRANSLATING A CURRENT DOCUMENT USING A PLANNED WORKFLOW ASSOCIATED WITH A PROFILE OF A TRANSLATOR AUTOMATICALLY SELECTED BY COMPARING TERMS IN PREVIOUSLY TRANSLATED DOCUMENTS WITH TERMS IN THE CURRENT DOCUMENT

(71) Applicant: SMARTCAT LLC, Kazan (RU)

(72) Inventors: Artem Ukrainets, Moscow (RU); Vladimir Gusakov, Moscow (RU); Ivan Smolnikov, Moscow (RU); Elena Tuzhilina, Moscow (RU)

(73) Assignee: SMARTCAT LLC, Kazan (RU)

( * ) Notice: Subject to any disclaimer, the term of this patent is extended or adjusted under 35 U.S.C. 154(b) by 0 days.

(21) Appl. No.: 15/782,004

(22) PCT Filed: Aug. 31, 2017

(86) PCT No.: PCT/US2017/049771
§ 371 (c)(1),
(2) Date: Jun. 6, 2018

(87) PCT Pub. No.: WO2019/045746
PCT Pub. Date: Mar. 7, 2019

(65) Prior Publication Data
US 2019/0065463 A1    Feb. 28, 2019

(51) Int. Cl.
*G06F 40/289* (2020.01)
*G06K 9/00* (2006.01)
(Continued)

(52) U.S. Cl.
CPC .......... *G06F 40/289* (2020.01); *G06F 40/123* (2020.01); *G06F 40/47* (2020.01);
(Continued)

(58) Field of Classification Search
CPC .......... G06F 17/20; G06F 17/21; G06F 17/28
See application file for complete search history.

(56) References Cited

U.S. PATENT DOCUMENTS

| | | | | |
|---|---|---|---|---|
| 6,885,985 B2 * | 4/2005 | Hull | ................... | G06F 17/2795 704/1 |
| 7,580,828 B2 * | 8/2009 | D'Agostini | ......... | G06F 17/2836 704/2 |

(Continued)

FOREIGN PATENT DOCUMENTS

| | | |
|---|---|---|
| EP | 3026614 A1 | 6/2016 |
| WO | 2009014005 A1 | 1/2009 |

OTHER PUBLICATIONS

About TM-Town—for Clients—TM-Town, "When a Bilingual Won't Do." 3 pages, retrieved from http://web.archive.org/web/20160820222523/https://www.tm-town.com/about-tm-town-for-clients on 11/17/2017.

(Continued)

*Primary Examiner* — Michael N Opsanick
(74) *Attorney, Agent, or Firm* — Lowenstein Sandler LLP (57) ABSTRACT

A method for translating a current electronic document is disclosed that includes storing previous translations of prior electronic documents for profiles of translation professionals, extracting terms from prior electronic documents, and generating glossaries that are each associated with one of the profiles and include a respective subset of terms. The method also includes receiving a request to translate the current electronic document, selecting one or more of the profiles based on proximity of the respective subset of terms to extracted terms of the current electronic document, evaluating qualities of the previous translations for each of the selected profiles, planning a workflow for translation of the current electronic document based on the selected profiles, (Continued)

and causing the current electronic document to be translated according to the planned workflow.

20 Claims, 6 Drawing Sheets (51) Int. Cl.
    *G06N 20/00*     (2019.01)
    *G06Q 10/00*     (2012.01)
    *G06F 40/47*     (2020.01)
    *G06F 40/51*     (2020.01)
    *G06F 40/123*     (2020.01)
    *G06N 20/20*     (2019.01)

(52) U.S. Cl.
    CPC ......... *G06F 40/51* (2020.01); *G06K 9/00456* (2013.01); *G06N 20/00* (2019.01); *G06Q 10/00* (2013.01); *G06N 20/20* (2019.01)

(56) References Cited

U.S. PATENT DOCUMENTS

| | | | |
|---|---|---|---|
| 8,386,235 B2 | 2/2013 | Duan | |
| 8,731,901 B2* | 5/2014 | Srihari | G06F 17/2863 |
| | | | 704/2 |
| 9,619,464 B2* | 4/2017 | Gusakov | G06F 17/289 |
| 2003/0140316 A1* | 7/2003 | Lakritz | G06F 17/2258 |
| | | | 715/201 |
| 2006/0282256 A1* | 12/2006 | Werner | G06F 17/2872 |
| | | | 704/5 |
| 2007/0294076 A1* | 12/2007 | Shore | G06F 17/2836 |
| | | | 704/2 |
| 2009/0070099 A1* | 3/2009 | Anisimovich | G06F 17/2755 |
| | | | 704/5 |
| 2011/0137636 A1* | 6/2011 | Srihari | G06F 17/2863 |
| | | | 704/2 |
| 2011/0282647 A1* | 11/2011 | Pastore | G06F 17/2836 |
| | | | 704/4 |
| 2011/0282795 A1 | 11/2011 | Kadosh | |
| 2013/0173247 A1* | 7/2013 | Hodson | G06F 17/28 |
| | | | 704/4 |
| 2013/0197896 A1* | 8/2013 | Chalabi | G06F 17/2735 |
| | | | 704/2 |
| 2014/0142918 A1 | 5/2014 | Dotterer et al. | |
| 2014/0358518 A1* | 12/2014 | Wu | G06F 17/2836 |
| | | | 704/3 |
| 2015/0120273 A1* | 4/2015 | Gusakov | G06F 17/289 |
| | | | 704/2 |
| 2016/0036740 A1 | 2/2016 | Barber et al. | |
| 2016/0162478 A1 | 6/2016 | Blassin et al. | |
| 2016/0162969 A1 | 6/2016 | Dotterer et al. | |
| 2016/0350284 A1 | 12/2016 | Yan et al. | |

OTHER PUBLICATIONS

PCT International Search Report and Written Opinion of the International Searching Authority for PCT/US17/49771, 12 pages, dated Nov. 8, 2017.

Translation Management System, "Smartling." 4 pages, retrieved from https://web.archive.org/web/20160422220416/https://www.smartling.com/translation-software/translation-management/ on 11/17/2017.

* cited by examiner

TRANSLATING A CURRENT DOCUMENT USING A PLANNED WORKFLOW ASSOCIATED WITH A PROFILE OF A TRANSLATOR AUTOMATICALLY SELECTED BY COMPARING TERMS IN PREVIOUSLY TRANSLATED DOCUMENTS WITH TERMS IN THE CURRENT DOCUMENT

TECHNICAL FIELD

This instant specification relates to data-driven automated selection of profiles of translation professionals for translation tasks.

BACKGROUND

Information gathering and exchange for any scientific, commercial, political or social purpose often requires fast and easy translation of content in order to make the universe of knowledge and ideas useful on a global scale. Computer programs that translate automatically from one language to another ("machine translation programs") can in principle meet this need and such programs have been developed and are in continued development for a variety of languages. For formal (as opposed to informal, idiomatic, colloquial) content in well-studied languages (e.g., English, French, Spanish, German, and others), such machine translation programs work reasonably well.

However, for more-difficult or less-studied languages (e.g., Arabic), existing machine translation programs do not work well, even for formal communications (e.g., Modem Standard Arabic), and they are particularly weak in the case of informal, colloquial, and idiomatic communications. Similarly, where specificity is needed, machine translation by itself is insufficient even for well-studied languages (e.g., English, French, Spanish, German, and others). Human translators can in principle provide accurate translations for difficult languages and informal communications, but Internet applications require constant availability and quick response, which cannot be assured in the case of existing methods that use human translators.

DETAILED DESCRIPTION

This document describes systems and techniques for data-driven automated selection of profiles of translation professionals (e.g., translators, editors, proofreaders, or interpreters) for translation tasks. This may be achieved by one or more processors executing instructions stored in one or more memories of a first process for automated selection of translation professionals experienced in a subject area to which content of an electronic document to be translated pertains, a second process for automated evaluation of translation qualities for the profiles associated with the translation professionals, and a third process for automated planning of translation resources and workflow of the translation professionals.

The systems and techniques described here may provide one or more of the following advantages. First, a system can provide subject area to translator professional matching with higher accuracy than prior systems. The system may provide fully automated subject area to translator professional matching without manual or empirical adjustment of parameters used to match subject areas to translator professionals. Rather than basing a quality evaluation of a profile of a translation professional on a rate of corrections by editors of translation work associated with the profile, the system may base the quality evaluation on machine learning using a model that is trained on editor evaluations of the translation work product to predict the quality. The system may provide fully automated quality evaluation of a profile of a translator professional without manual or empirical adjustment of parameters used in the quality evaluation.

The details of one or more implementations are set forth in the accompanying drawings and the description below. Other features and advantages will be apparent from the description and drawings, and from the claims.

Figure 1:
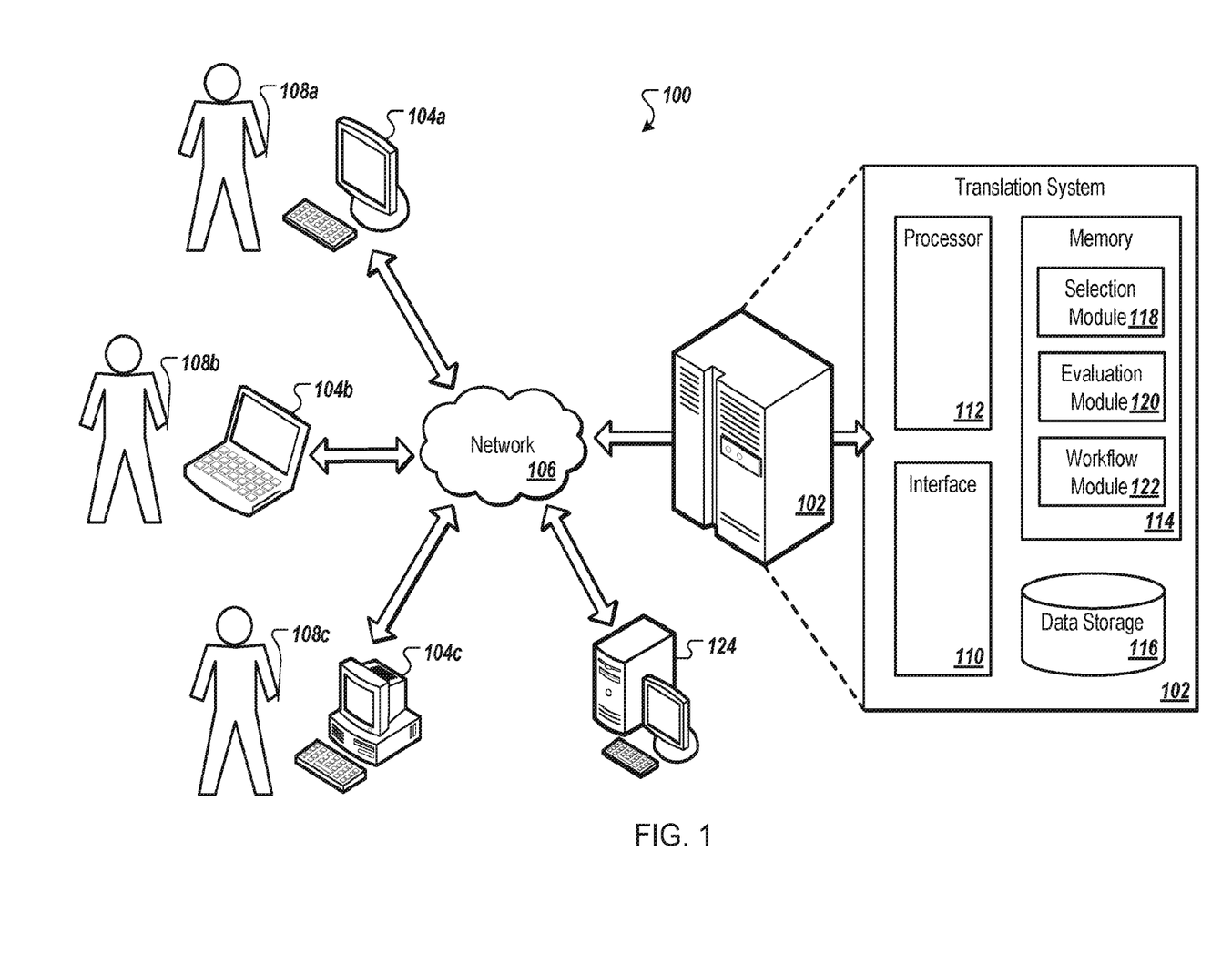
FIG. 1 is a schematic diagram that shows an example of a system for data-driven automated selection of profiles of translation professionals for translation tasks.

FIG. 1 is a schematic diagram that shows an example of a system 100 for data-driven automated selection of profiles of translation professionals for translation tasks. The system 100 includes a translation system 102 in communication with a client system 124 and multiple translator systems 104a-c over a network 106, such as local area network, a wide area network, or one or more of the computing devices that make up the Internet. The translator systems 104a-c are used by multiple translation professionals 108a-c to translate electronic documents at the direction of the translation system 102.

The translation system 102 may receive a request to translate an electronic document from the client system 124, for example, through at least one interface device 110 to the network 106. The interface device 110 provides communication between the translation system 102 and the network 106 or networks used to communicate with the client system 124 and the translator systems 104a-c. The request may include the electronic document (or an address that the translation system 102 or another system may use to retrieve the electronic document), an identification of a source language of the electronic document, and/or an identification of a target language to which content of the electronic document is to be translated.

The translation system 102 further includes at least one processor 112, at least one memory 114, and at least one data storage device 116. The memory 114 stores instructions for one or more modules, such as a selection module 118, an evaluation module 120, and a workflow module 122. The processor 112 executes the instructions of the modules to perform the operations described herein.

The translation professionals are each associated with a profile that may be stored, for example, at the translation system 102 in the data storage device 116. The processor 112 may execute the instructions of the selection module 118 to select ones of the profiles associated with the translation professionals to perform translation for the electronic document. The processor 112 may execute the instructions of the evaluation module 120 to evaluate qualities of translations previously performed by the profiles associated with the translation professionals. The processor 112 may execute the instructions of the workflow module 122 to make a final selection of ones the profiles to translate the electronic document based on the translation qualities and resource and/or workflow parameters.

The translation system 102 may then assign and/or notify the selected profiles of the translation to be performed for the electronic document. The translation system 102 may provide the electronic document, or at least a portion thereof, to ones of the translator systems 104*a-c* for the selected ones of the profiles. The ones of the translator systems 104*a-c* receive the translations from the translation professionals and provide the translations to the translation system 102. The translation system 102 receives the translations and provides a final translation of the electronic document, based on the received translations, to the client system 124.

FIGS. 2A-D are flow charts that show examples of processes for data-driven automated selection of profiles of translation professionals for translation tasks, in accordance with some aspects of the same disclosure. The processes may be performed, for example, by a system such as the system 100. For clarity of presentation, the description that follows uses the system 100 as an example for describing the processes. However, another system, or combination of systems, may be used to perform the processes.

Figure 2A:
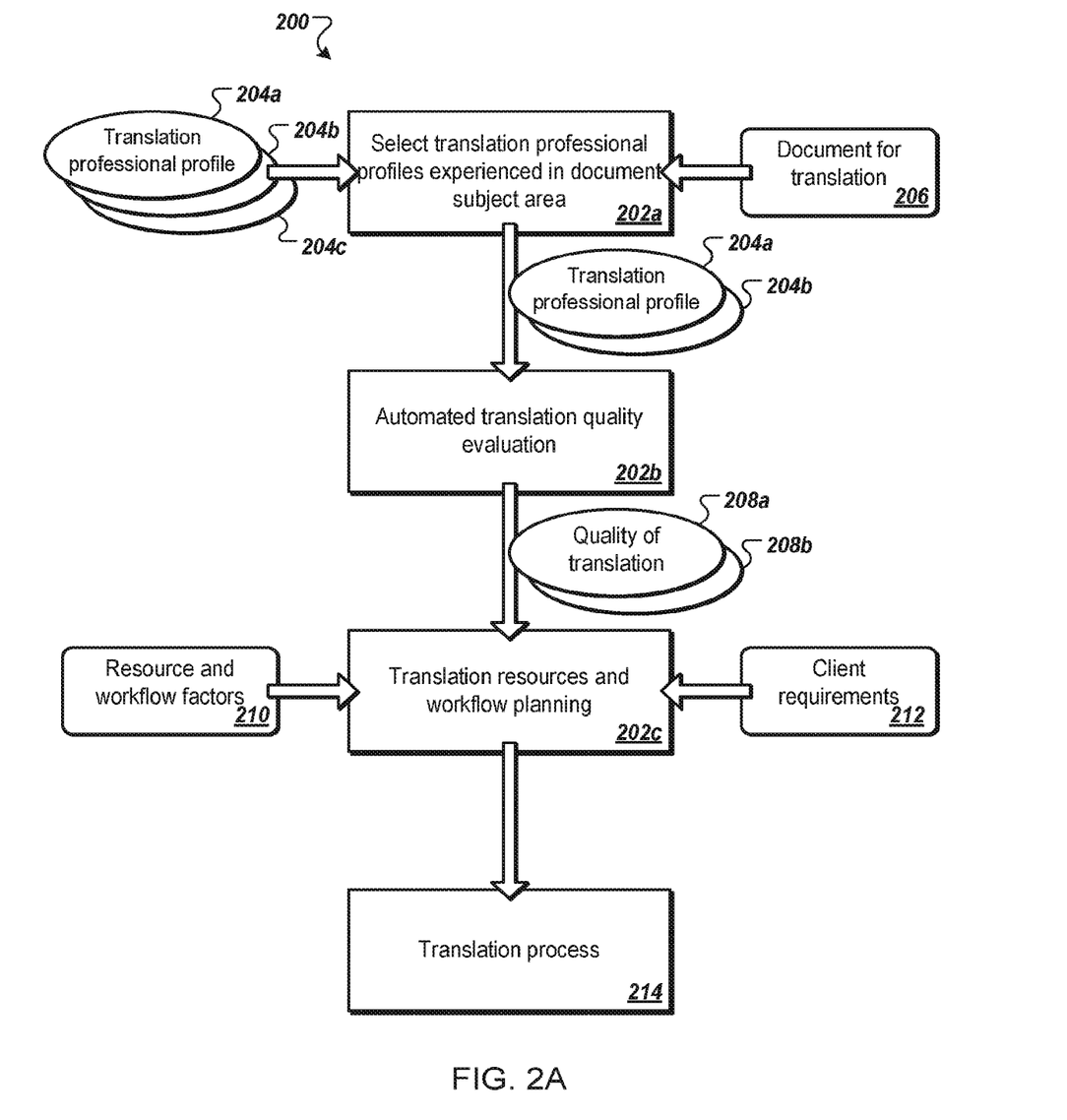
FIGS. 2A-D are flow chart that show examples of processes for data-driven automated selection of profiles of translation professionals for translation tasks.

FIG. 2A is a flow chart that shows an example of an overall process 200 for data-driven automated selection from one or more profiles 204*a-c* of translation professionals for translation tasks. The overall process 200 may include one or more sub-processes 202*a-c*. The first sub-process 202*a* may be performed, for example, by the selection module 118 and includes an automated selection of one or more of the profiles 204*a-b* of the translation professionals experienced in a subject area to which content of an electronic document 206 to be translated pertains. The second sub-process 202*b* may be performed, for example, by the evaluation module 120 and includes an automated evaluation of one or more qualities of translations 208*a-b* for the profiles 204*a-b* that were selected. The third sub-process 202*c* may be performed, for example, by the workflow module 122 and includes an automated planning of translation resources and workflow of the translation professionals.

The sub-processes 202*a-c* may be mutually interconnected. For example, the third sub-process 202*c* may be based on the qualities of translations 208*a-b* from the second sub-process 202*b*, and only the professionals identified during the first sub-process 202*a* may take part in the second sub-process 202*b*. In some implementations, the sub-processes 202*a-c* may occur in another order, such as a reverse order. For example, a system may use completed translations to evaluate and update the evaluations of the translation professionals who participated in a translation project, glossaries and corpora used in the project may be updated, and selection of relevant translation professionals for subsequent texts may be improved.

The resource and workflow planning of the third sub-process 202*c* may include one or more factors 210 for the translation professionals, such as a cost charged by each translation professional for the translation, an estimated amount of time taken by each translation professional to perform the translation, and the qualities of translations 208*a-b* associated with each of the translation professionals. The translation system 102 may store the parameters for the cost, time, and the qualities of translations 208*a-b* for each of the profiles in the data storage device 116. The workflow module 122 may calculate the cost for each translation professional for a translation project based on a rate indicated by the translation professional in the profile associated with the translation professional. The workflow module 122 may calculate the amount of time taken by each translation professional via a sub-system that monitors the work of the translation professionals associated with each profile in real time with a cloud-based architecture.

The workflow module 122 may grade or evaluate the compliance of each translation professional with the assigned task using algorithms for textual analysis and machine learning. The workflow module 122 uses the qualities of translations 208*a-b* from the evaluation to further refine the list of the profiles 204*a-b* to be used for the translation. The workflow module 122 may use one or more client requirements 212 provided by the client system 124 when grading or evaluating the compliance of each translation professional with the assigned task, such as when the translation is due to the client system 124 or what levels of the qualities of translations 208*a-h* are acceptable for the client system 124. The translation system 102 may then cause a translation process 214 to occur using the finally selected ones of the profiles 204*a-b* and the planned workflow.

Figure 2B:
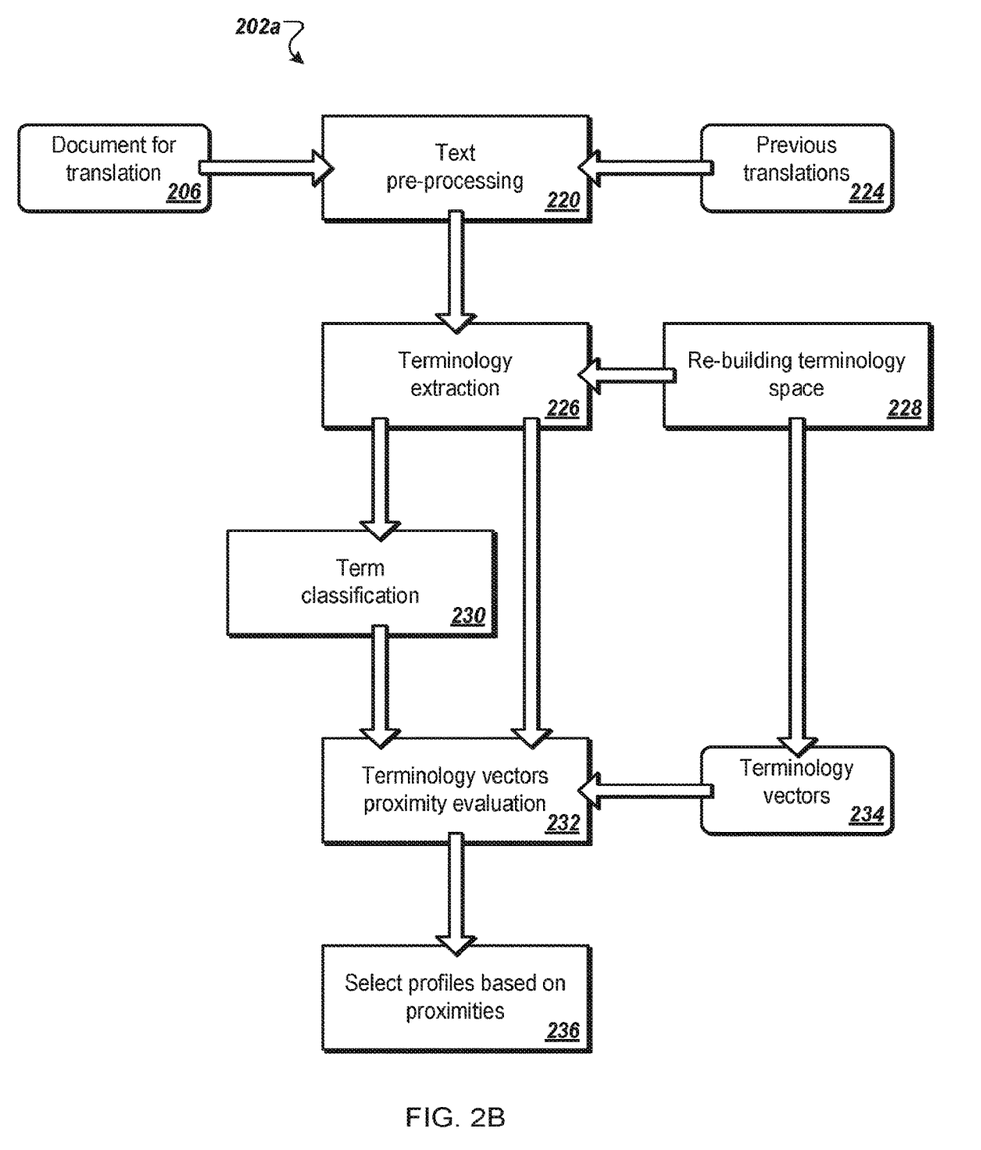

FIG. 2B is a flow chart that shows an example of the first sub-process 202*a* for automated selection of translation professionals experienced in a subject area to which content of an electronic document to be translated pertains. The selection module 118 may perform the first sub-process 202*a* to select profiles for translation professionals who are conversant in the subject area of the content of the electronic document to be translated (since, for example, a translation professional who works with legal texts may not be competent at handling technical documents). The selection module 118 narrows down the pool of potential translation professionals to optimize the time needed for further selection and optimization during the second sub-process 202*b* and the third sub-process 202*c*. The selection module 118 selects one or more of the profiles 204*a-c* of the translation professionals 108*a-c* based on content of one or more previous translations of electronic documents 224 that is in a same subject area as the content of the electronic document 206 to be translated. In some implementations, a lack of subject-area knowledge and terminology by a translation professional may be a primary cause of translation errors and low quality of translations. The first sub-process 202*a* may apply one or more of the following stages to define a set of profiles of translation professionals from which the final profiles of the translation professionals for the translation project will be selected.

The first sub-process 202*a* may include, at box 220, pre-processing of text from the electronic document 206 to be translated and/or the previous translations of electronic documents 224. For example, the selection module 118 may perform a syntactic and morphological filtering of the text of the previous translations of electronic documents 224. The filtering may include, for example, stripping of metadata, tags, and formatting from the text; marking up of parts of speech in the text; and/or extraction of root forms of words from the text.

The first sub-process 202*a* may include, at box 226, extraction of terminology from the electronic documents in the translation system 102 that have previously been translated by the profiles. The extraction may include creation of a common glossary based on the extracted terms and individual glossaries for each of the profiles for the terms translated by each profile. In some implementations, the common glossary and/or the individual glossaries reduce an amount of data to be analyzed and enables building criteria for selecting translators based on the knowledge of the translation professionals of a specific set of terms.

For example, the selection module 118 may perform the extraction of the terminology by performing a linguistic filtering. The linguistic filtering may include an identification of candidate terms (e.g., potential glossary entries from the text) by searching for words and phrases that fit certain patterns, such as a noun pattern, an adjective and noun pattern, a gerund and noun pattern, and/or a noun and noun pattern, etc.

The selection module 118 may perform the extraction of the terminology by performing a calculation of quantitative characteristics (C-Value) for each candidate term from the text using, for example, the following calculation:

$$C\text{-Value}*(a) = \log_2|a + const| * \left( f(a) - \frac{1}{|T_a|} \sum_{b \in T_a} f(b) \right),$$

where |a| is the number of words in candidate term a, $T_a$ are the candidate terms containing candidate term a, f(a) is the frequency of candidate term a, and $|T_a|$ is the number of candidate terms containing candidate term a. A high C-Value indicates a high likelihood that the candidate term is significant enough to be added to the common glossary and/or an individual glossary.

The selection module 118 may use two different approaches to select the profiles 204a-b of the translation professionals 108a-b, a simplified approach and a thematic approach. The selection module 118 may select the approach to use based on the volume of the previous translations of electronic documents 224 associated with the profiles 204a-c of the translation professionals 108a-c and the electronic document 206 to be translated.

The selection module 118 may select the simplified approach for low volumes. For the simplified approach, the selection module 118 may select the profiles 204a-b of the translation professionals 108a-b using a term-by-term comparison of the terms extracted from the electronic document 206 to be translated with the terms extracted from the previous translations of electronic documents 224. For each term extracted from the electronic document 206, the selection module 118 may calculate how many times the term is found in the electronic document 206 to identify one or more terminology frequency vectors, $a_i, \ldots, a_k$.

For each of the profiles 204a-c of the translation professionals 108a-c, the selection module 118 may, at box 232, calculate a numerical value of a proximity of the terms in the electronic document 206 to the terms from the previous translations of electronic documents 224 using the following calculation:

$$Q_T = \sum_{i=1}^{k} \ln(a_i+1) \cdot \ln(w_i+1),$$

where $w_i, \ldots, w_k$ are one or more terminology frequency vectors 234, each of a particular term in the previous translations of electronic documents 224 by a profile of a translation professional, T.

Alternatively or in addition, the selection module 118 may select the thematic (or subject) approach for high volumes. For the thematic approach, the selection module 118 may classify, at box 230, the terms from the electronic document 206 and/or the previous translations of electronic documents 224 into one or more classes. The selection module 118 may determine the classes of the terms based on matching and/or comparing each of the terms to a term associated with a subject area, for example, at a particular level of a subject tree. Alternatively or in addition, the selection module 118 may automatically classify the terms based on machine learning clustering that maximizes a distance between clusters of the terms. Once the terms have been clustered, the selection module 118 may assign an identifier to the clusters, such as a number, and each of the terms may be assigned the identifier of the cluster to which the term belongs. Each cluster may then be considered a quasi-subject area.

The selection module 118 may represent each electronic document in the corpus of the previous translations of electronic documents 224 by a subject vector. For each of the previous translations of electronic documents 224 in the corpus, the selection module 118 may calculate a frequency of the appearance of the term in particular clusters. The selection module 118 represents each previous translation of an electronic document (associated with a particular profile) by a subject vector that is the number of clusters in which the terms appear.

The selection module 118 may calculate, at box 232, the proximity between the subject vector of the electronic document 206 and the subject vectors of all of the previous translations of electronic documents 224 by the profiles 204a-c. The selection module 118 may determine the proximity or similarity between the subject vector of the electronic document 206 and each of the subject vectors of the previous translations of electronic documents 224 using the following calculation for cosine similarity between two vectors:

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}},$$

where A may be the subject vector of the electronic document 206 and each of the subject vectors of the previous translations of electronic documents 224 may be B, and where $A_i$ and $B_i$ are the components of the vectors A and B, respectively. The selection module 1118 may exclude ones of the profiles 204 for subject vectors that are located far from the subject vector of the electronic document 206 (e.g., have a low proximity value) from further processing in order to reduce the number of the selected ones of the profiles 204a-c and to reduce a computational load on the translation system 102. The selection module 118 may select the simplified approach for remaining ones of the profiles 204a-c that do not have high volumes.

The selection module 118 may, at box 228, re-build the terminology space of the terminology frequency vectors 234 as translations of additional electronic documents are associated with the profiles 204a-c. The selection module 118 may also update the glossaries with new terms from the additional electronic documents.

Once proximities are determined under either the simplified approach or the thematic approach, the selection module 118 may then select, at box 236, ones of the profiles 204a-c based on the proximities of the terms for the profiles 204a-c to the terms from the electronic document 206 for the simplified approach or based on the proximities of the subject vectors for the profiles 204a-c to the subject vector from the electronic document 206 for the thematic approach. For example, the selection module 118 may select a particular number of the profiles 204a-b that have highest proximities and/or a threshold level of the proximity.

Figure 2C:
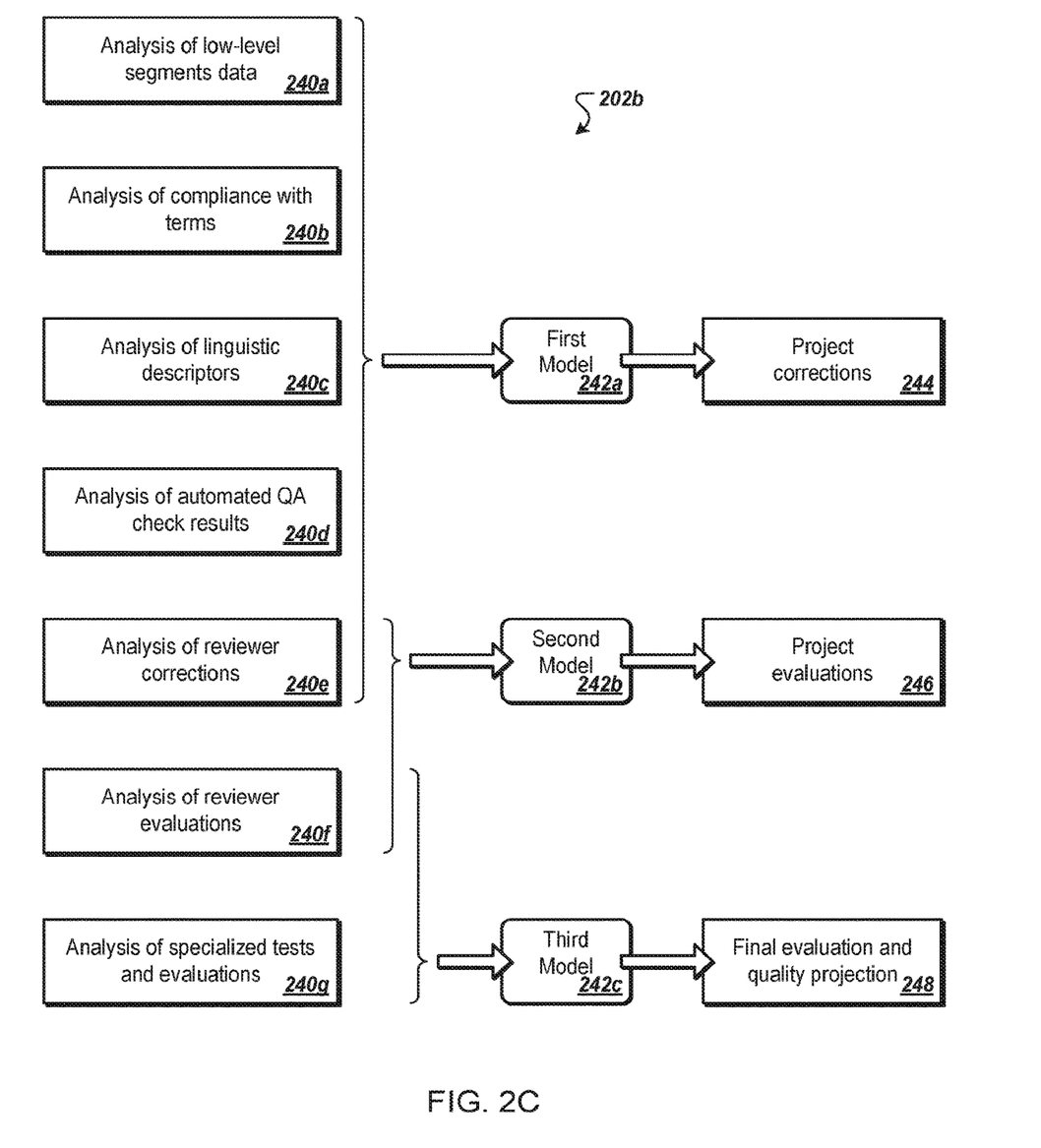

FIG. 2C is a flow chart that shows an example of the second sub-process 202b for automated evaluation of translation qualities for the profiles associated with the translation professionals. The second sub-process 202b for many characterizes and quantifies the qualities of translations 208a-b for the profiles 204a-c of the translation professionals 108a-c. The previous translations of electronic documents 224 may, for example, contain errors of different types, such as typos, grammatical errors, and/or incorrect terminology. The evaluation module 120, for example, may use information regarding the errors to identify the qualities of translations 208a-b. The translation system 102 may then use the qualities of translations 208a-b for future translations to select from the profiles 204a-c of the translation professionals 108a-c. In some implementations, quantitative characteristics associated with a profile of a particular translation professional may affect a client requirement, such as a due date for a translation or a cost of a translation (since correcting mistakes may take additional time and is often comparable to re-translating the electronic document 206). The evaluation module 120 may use this information to predict the qualities of translations 208a-b for the profiles 204a-b and to select the profiles 204a-b of the most qualified ones of the translation professionals 108a-c to translate the electronic document 206. The evaluation module 120 may evaluate multiple aspects of ones of the previous translations of electronic documents 224 for each of the profiles 204a-c to calculate a corresponding one of the qualities of translations 208a-b as well as a predicted quality level for future translations.

The aspects may include an analysis, at box 240a, of low-level data for each segment of a translation. For example, the evaluation module 120 may analyze time spent by the profile of the translation professional working on the translation of the segment, a number of actions taken by the profile of the translation professional to translate the segment, and a type of each correction made at each stage of the translation by the profile of the translation professional (e.g., corrections by an editor for the translation system 102 after the translation professional or corrections by the client system 124 after the editor).

The aspects may include an analysis, at box 240h, of compliance between the translated terms and the project glossary and/or automatically generated terms based on a subject analysis. For example, the evaluation module 120 may determine that a threshold number or rate of translated terms for a profile do not appear in project glossaries and/or automatically generated terms for the electronic documents being translated. The evaluation module 120 may compare the translated terms to terms in the project glossary for the translation project to determine how many of the translated terms do not appear in the glossary and to check the consistency of the translated terms. In addition, the evaluation module 120 may add extracted terms with commonly used translations of the extracted terms, which surpass a particular threshold frequency. In some implementations, the evaluation module 120 may use a lower weight for the commonly used translations than for the other translated terms. In some implementations, the evaluation module 120 may only use the extracted terms, for example, if there is no project glossary.

The aspects may include an analysis, at box 240c, of a set of linguistic descriptors. For example, the evaluation module 120 may analyze an average length of sentences in the translations, a variety and/or variability of a vocabulary in the translations, or a complexity of text in the translations, etc.

The aspects may include an analysis, at box 240d, of results of automatic quality assurance (QA) checks. For example, the evaluation module 120 may analyze results of automatic checks for spelling, grammar, punctuation, tag structure and order, consistency of placeholders, extra and/or double spaces, contextual matches control, correct transfer of dates and numerical parameters, case control, multi-source and multi-target checks, or repeating words, etc.

The aspects may include an analysis, at box 240e, of reviewer corrections. For example, the evaluation module 120 may analyze reviewer corrections as detailed ratings with classifications by error types.

The aspects may include an analysis, at box 240f, of reviewer evaluations. For example, the evaluation module 120 may analyze reviewer evaluations as a composite evaluation as per a predefined quality rating.

The aspects may include an analysis, at box 240g, of translation tests passed by the translation professionals 108a-c associated with the profiles 204a-c in different subject areas, which may be a manual evaluation. In some implementations, the translation tests may be performed over a constant set of texts, therefore the method of evaluation and test samples are not varied so that the evaluation module 120 may compare the test results for the profiles 204a-c to one another.

The translation system 102 may store translation data for each of the profiles 204a-c, for example, in the data storage device 116. The translation data may include, for each of the profiles 204a-c and for each electronic document translated by the translation professional associated with the profile, a source text to be translated and a corresponding translated text that are split into segments, the low-level data, the results of the automatic QA checks, and/or the set of linguistic descriptors. The translation system 102 may store results of corrections by reviewers (e.g., an amount of corrections) at the next stage of the translation workflow. The translation system 102 may store results of evaluation ratings by reviewers in one or more aspects (e.g., precision, language, and/or style) according to a particular rating scale. In some implementations, the translation system 102 may store evaluations of the translations for the profiles 204a-c according to the formal Language Quality Assurance (LQA) procedure with definitions of the types of mistakes found.

To automatically evaluate the qualities of translations 208a-b, the second sub-process 202b includes generating multiple machine-learning models 242a-c. For example, the evaluation module 120 may compile the first machine-learning model 242a to evaluate a correlation between automatically measured parameters, at boxes 240a-d, and human corrections done by reviewers at an editing stage, at boxes 240e. The evaluation module 120 may compile the second machine-learning model 242b to evaluate a correlation between the human corrections, at box 240e, and the human quality evaluation, at box 240f. The evaluation module 120 may build the third machine-learning model 242c for correlation between the automatically measured parameters, at box 240g, and the human quality evaluation, at box 240f.

The correlations in the first machine-learning model 242a are used, at box 244, to project or predict a number of corrections for each of the profiles 204a-c for each translation. The correlations in the second machine-learning model 242b are used, at box 246, to project or predict evaluations for each of the profiles 204a-c for each translation. In some implementations, the second machine-learning model 242b may be used for project or predict evaluations for a profile even though the profile is not associated with any corrections at the editing stage. The correlations in the third machine-learning model 242c are used, at box 248, to determine a final evaluation and quality projection for a profile. The machine-learning models 242a-c may be validated and improved iteratively based on the results of the formal LQA procedure, the translation tests, and other new data (e.g., evaluations, or corrections, etc.).

Figure 2D:
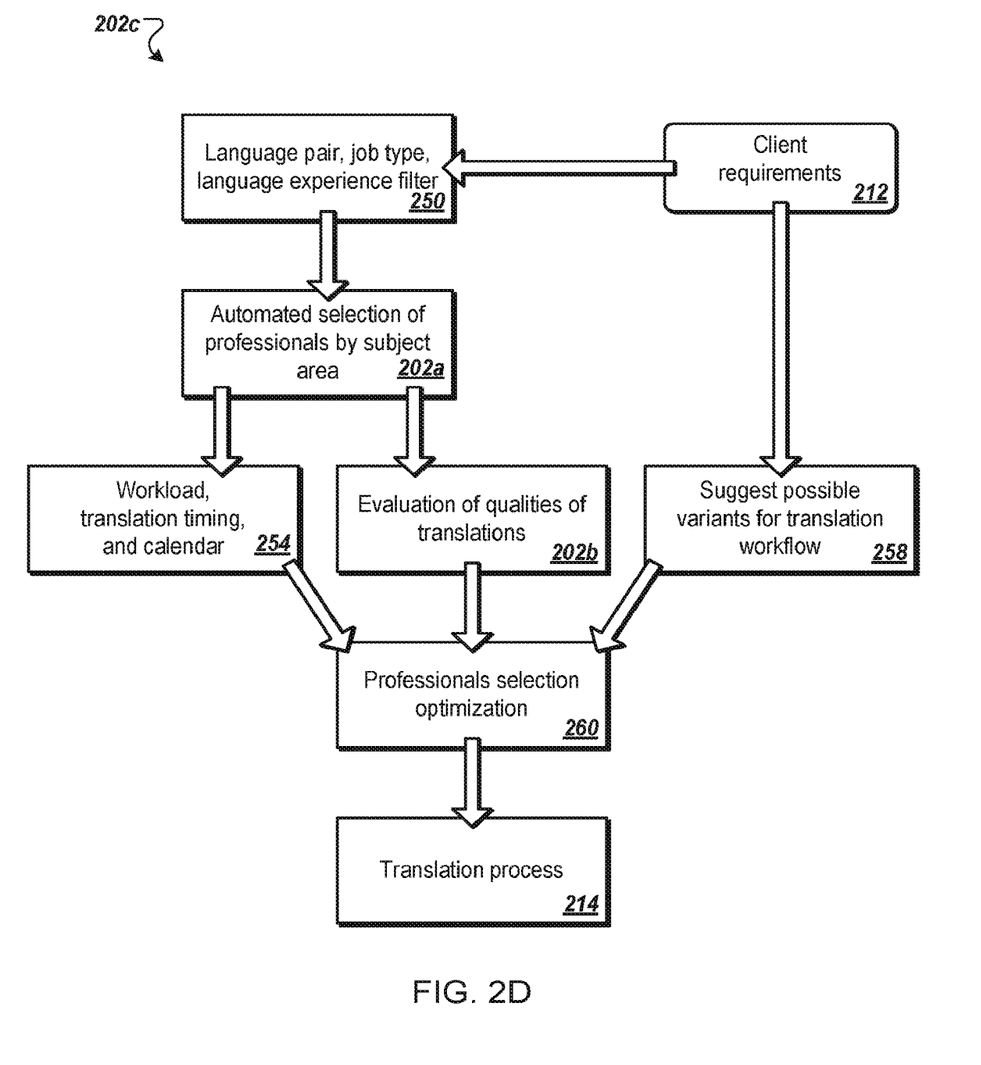

FIG. 2D is a flow chart that shows an example of the third sub-process 202c for automated planning of translation resources and workflow of the profiles associated with the translation professionals. The third sub-process 202c for automated planning of translation resources and workflow incorporates the results obtained in the first sub-process 202a (automated selection of the profiles 204a-b of the translation professionals 108a-c by subject area) and the second sub-process 202b (evaluation of the qualities of translations 208a-b). For example, the workflow module 122 may prepare, at box 250, a plan for implementation of the project to translate the electronic document 206 based on the client requirements 212 (e.g., translation materials, deadline for the translation, required quality of the translation, allowed cost of the translation, etc.) in a way to optimize existing resources (e.g., the translation professionals 108a-c, who have certain limitations of their own, such as possible translation speed, availability, and language knowledge in subject area of the electronic document 206).

The workflow module 122 may split the translation project into multiple separate parts (if the workflow module 122 determines that this is optimal) and distribute the parts to multiple ones of the translation professionals 108a-c (e.g., translators, editors, and/or proofreaders). For example, the workflow module 122 may take into account, at box 254, the workload of each of the translation professionals both in the real time and predicted for the time-frame of the translation project based on the current work-in-progress projects assigned to the profiles 204a-c of the translation professionals 108a-c and translation speed of each of the translation professionals 108a-c as identified in the profiles 204a-c. The workflow module 122 may allow for work to occur in parallel (e.g., by multiple ones of the translation professionals 108a-c) at multiple stages (e.g., translation, editing, and/or proofreading).

The workflow module 122 selects, at box 260, an optimal choice from the profiles 204a-c of the translation professionals 108a-c for each of the workflow stages (e.g., translation, editing, and proofreading). In some implementations, the workflow module 122 may select a two-stage/translation-editing (TE) workflow or a three-stage/translation-editing-proofreading (TEP) workflow to ensure high quality of the translation. In some implementations, the workflow module 122 may assign a single one of the profiles 204a-c to the translation to perform all of the stages of the translation. The workflow module 122 may select one of the profiles 204a-c to assign the translation to based on the profiles 204a-b selected by the selection module 118 and the qualities of translations 208a-b provided by the evaluation module 120. The workflow module 122 may select one of the profiles 204a-c to assign the editing to (e.g., a profile that has greater qualifications than the profile assigned to the translation) for comparing the source text of the electronic document 206 to the translation generated by the selected translator. The workflow module 122 may select one of the profiles 204a-c to assign the proofreading to (e.g., who may review only the translation and corrects small errors of style, typos, or formatting, etc.).

In some implementations, the workflow module 122 suggests, at box 258, possible variants for the translation workflow, such as the number of stages and the number of the profiles 204a-c based on the client requirements 212. For example, the client requirements 212 may explicitly indicate the number of or specific translation stages to be used, or a user of the client system 124 may select one of the options offered by the translation system 102, in which case the workflow module 122 selects the corresponding project workflow. If the workflow module 122 determines that the translation project cannot be performed within a particular timeframe (e.g., as specified in the client requirements 212) with the indicated number of stages, then the workflow module 122 may remove or suggest removal of one of the subsequent stages from the workflow (e.g., editing or proofreading). The workflow module 122 may compensate for removal of the stage by replacing the translation professional assigned to the first-stage/translation with a profile of a translation professional that has a higher quality of translation than the original profile that was assigned.

The workflow module 122 may determine, at box 254, the timing of delivering the translation project to the client system 124. The timing of the delivery may be based on the number of the profiles 204a-c that have been assigned to the translation of the electronic document 206. The workflow module 122 may divide up the translation into multiple segments and separately assign the segments to multiple ones of the profiles 204a-c (e.g., segments of the translation may be performed in parallel) to reduce the amount of time needed to complete the translation. Conversely, spreading the translation tasks among a larger number of the profiles 204a-c may, in some implementations, incur other risks, such as refusal by translational professionals who are not interested in translating short texts and a potential for inconsistency in the translation, since different translation professionals may use varying terms, phrasing, and stylistic constructions. In some implementations, the workflow module 122 may have an effective lower limit for words assigned to a single translation professional of approximately 250 words (e.g., one translation page). In some implementations, this lower limit may be the number of words that can typically be translated by the average translation professional in one hour. In some implementations, the client requirements 212 for urgent projects typically require no less than one hour for completion.

in some implementations, one or more of the translation professionals may not be willing or able to accept a particular task as the highest-quality translation professionals may be the busiest and least available. Accordingly, the workflow module 122 may create, at box 254, a work calendar to take current translator availability into account during the selection process. The workflow module 122 may allocate time in a work calendar for each of the profiles 204a-c. The workflow module 122 may estimate the amount of time each of the profiles 204a-c may work and the amount of time each translation task may take for the translation professional associated with the profile. The workflow module 122 may identify the difference between the amount of time a profile may work and the amount of work assigned to the profile as an available workload. In some implementations, by checking the work calendar to take availability into account, the workflow module 122 may find "hidden reserves" of underutilized downtime during which the workflow module 122 may assign more translation tasks to the translation professionals 108a-c.

If the client requirements 212 do not explicitly indicate a completion time for the translation of the electronic document 206, then the translation system 102 may provide a user interface to the client system 124 with three workflow options that correspond to different project completion times. In the first option, the completion time may be maximized to reasonable extent. If selected, the workflow module 122 may calculate the maximum completion time (in days) using an average daily output (e.g., 2,000, 4,000, and 12,000 words for translators, editors, and proofreaders, respectively) and the selected number of stages. In the second option, the completion time may be minimized. If selected, the workflow module 122 may minimize the completion time by assigning more of the translation professionals 108a-c to each translation stage and/or by performing fewer translation stages. The workflow module 122 may calculate the maximum number of translation professionals, $N_{max}$, as:

$$N_{max}=2 \cdot \ln(W),$$

where W is the number of words in the project. In the third option, if selected by the client system 124, the workflow module 122 uses an average between the maximum completion time under the first option and the minimum completion time under the second option.

The result of the sub-processes 202a-c is a set of parameters for completing the translation of the electronic document 206 including which stages of the workflow will be performed, a selected set of the profiles 204a-c of the translation professionals 108a-c to be assigned to specific stages and segments of the text of the electronic document 206, a volume of work and work plan for each of the selected ones of the profiles 204a-c, and a time of completion/project delivery schedule.

When the translation of the electronic document 206 is complete, the source text of the electronic document 206 in the source language and the translated text in the target language are added to the corpus of the previous translations of electronic documents 224. In addition, the evaluation module 120 may reevaluate and store the qualities of translations 208a-b and productivities for each of the profiles 204a-c in the data storage device 116.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 3:
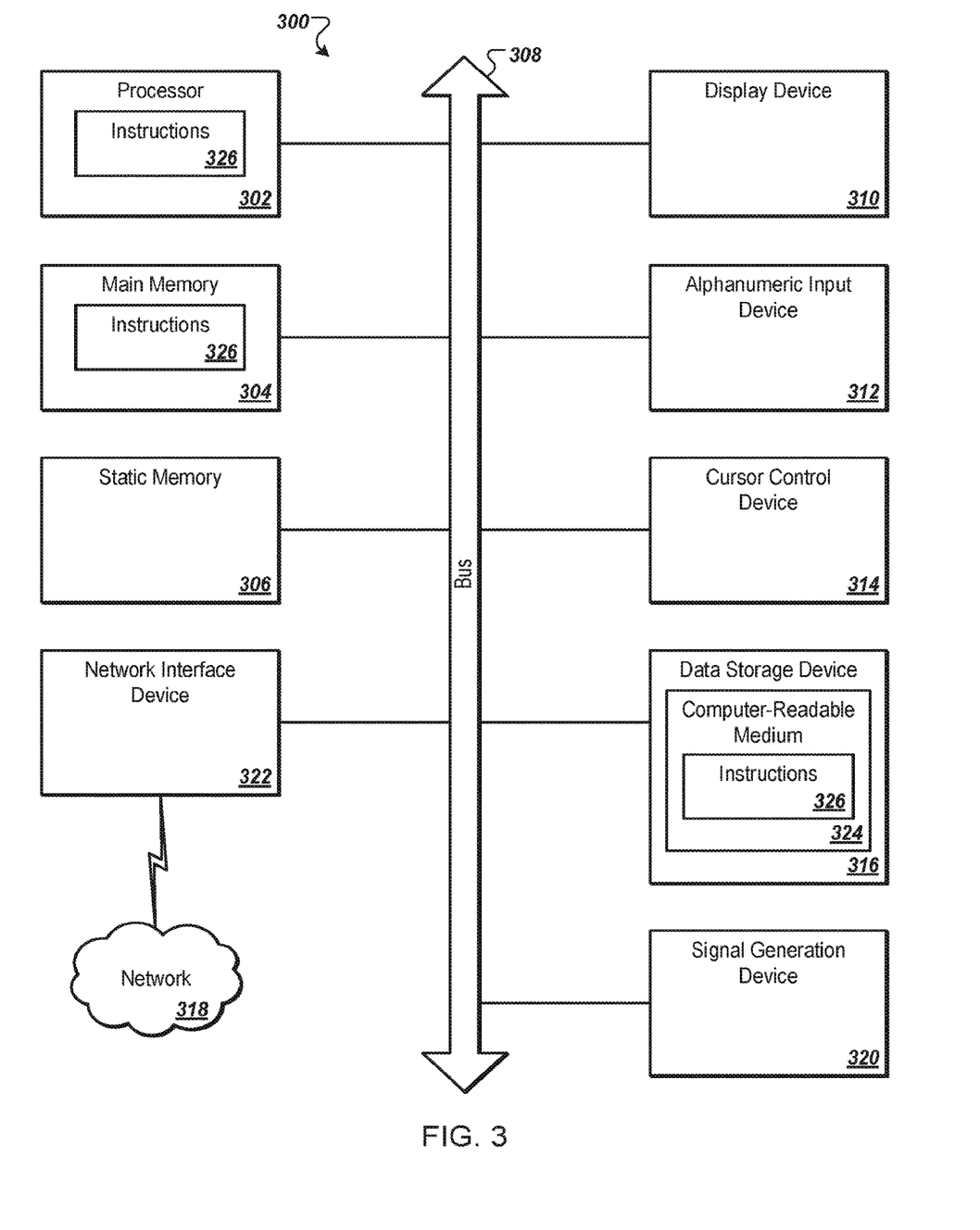
FIG. 3 is a schematic diagram that shows an example of a computing system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the selection module 118, the evaluation module 120, and/or the workflow module 122 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the selection module 118, the evaluation module 120, and/or the workflow module 122 embodying any one or more of the methodologies or functions described herein. The sets of instructions 326 of the selection module 118, the evaluation module 120, and/or the workflow module 122 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    storing, in a data storage device, a plurality of previous translations of prior electronic documents for a plurality of profiles of translation professionals;
    extracting, by at least one processor, a plurality of terms comprising words and patterns of words from the prior electronic documents;
    generating, by the processor, a plurality of glossaries, wherein each glossary of the plurality of glossaries is associated with one of the plurality of profiles and includes a subset of terms from the plurality of terms, wherein the subset of terms was translated by the one of the plurality of profiles;
    receiving, from a client system, a request to translate a current electronic document from a source language to a target language;
    selecting, by the processor, one or more of the plurality of profiles based on a proximity of the subset of terms of a glossary associated with a respective profile of the plurality of profiles to extracted terms of the current electronic document;
    evaluating, by the processor, qualities of the previous translations of the prior electronic documents for each of the selected one or more of the profiles;
    planning, by the processor, a workflow for translation of the current electronic document based on the selected one or more of the profiles; and
    causing the current electronic document to be translated according to the planned workflow.

2. The method of claim 1, wherein selecting the one or more of the profiles comprises:
    generating a prior terminology frequency vector associated with one of the plurality of glossaries wherein the prior terminology frequency vector comprises frequency information of the subset of terms of the one of the plurality of glossaries;
    generating a current terminology frequency vector that comprises frequency information of extracted terms of the current electronic document; and
    comparing the current terminology frequency vector with the prior terminology frequency vector associated with the one of the plurality of glossaries.

3. The method of claim 1, wherein selecting the one or more of the profiles comprises:
    classifying each of the prior electronic documents translated by each of the profiles as being in one or more subject areas among a plurality of subject areas based on the plurality of terms extracted from the prior electronic documents;

classifying the current electronic document as being in a subject area among the plurality of subject areas based on the terms extracted from the current electronic document; and comparing the subject area of the current electronic document with the subject areas of the prior electronic documents to determine the proximity and that the one or more of the profiles are experienced in the subject area.

4. The method of claim 3, wherein classifying comprises automatically classifying based on machine learning clustering of the terms extracted from the current electronic document and the plurality of terms extracted from the prior electronic documents.

5. The method of claim 1, wherein the one or more of the profiles comprises multiple ones of the profiles, and wherein planning the workflow for the translation comprises:

dividing text of the current electronic document into a plurality of segments; and assigning the segments to the multiple ones of the profiles to be translated in parallel.

6. The method of claim 5, wherein dividing the text of the current electronic document into the segments has a lower limit on a number of words in each of the segments.

7. The method of claim 1, wherein the one or more of the profiles comprise multiple ones of the profiles, wherein the translation comprises a plurality of stages, and wherein planning the workflow of the translation comprises assigning the stages to the multiple ones of the profiles based on requirements, from the client system, for the translation.

8. A non-transitory computer-readable medium having instructions stored thereon that, when executed by at least one processor, cause the processor to:

store, in a data storage device, a plurality of previous translations of prior electronic documents for a plurality of profiles of translation professionals;

extract, by the processor, a plurality of terms comprising words and patterns of words from the prior electronic documents;

generate, by the processor, a plurality of glossaries, wherein each glossary of the plurality of glossaries is associated with one of the plurality of profiles and includes a subset of terms from the plurality of terms, wherein the subset of terms was translated by the one of the plurality of profiles;

receive, from a client system, a request to translate current electronic document from a source language to a target language;

select, by the processor, one or more of the plurality of profiles based on a proximity of the subset of terms of a glossary associated with a respective profile of the plurality of profiles to extracted terms of the current electronic document;

evaluate, by the processor, qualities of the previous translations of the prior electronic documents for each of the selected one or more of the profiles;

plan, by the processor, a workflow for translation of the current electronic document based on the selected one or more of the profiles; and cause the current electronic document to be translated according to the planned workflow.

9. The computer-readable medium of claim 8, wherein to select the one or more of the profiles, the instructions are further to cause the processor to:

generate a prior terminology frequency vector associated with one of the plurality of glossaries wherein the prior terminology frequency vector comprises frequency information of the subset of terms of the one of the plurality of glossaries;

generate a current terminology frequency vector that comprises frequency information of extracted terms of the current electronic document; and compare the current terminology frequency vector with the prior terminology frequency vector associated with the one of the plurality of glossaries.

10. The computer-readable medium of claim 8, wherein to select the one or more of the profiles, the instructions are further to cause the processor to:

classify each of the prior electronic documents translated by each of the profiles as being in one or more subject areas among a plurality of subject areas based on the plurality of terms extracted from the prior electronic documents;

classify the current electronic document as being in a subject area among the plurality of subject areas based on the terms extracted from the current electronic document; and compare the subject area of the current electronic document with the subject areas of the prior electronic documents to determine the proximity and that the one or more of the profiles are experienced in the subject area.

11. The computer-readable medium of claim 10, wherein, to classify, the instructions are further to cause the processor to automatically classify based on machine learning clustering of the terms extracted from the current electronic document and the plurality of terms extracted from the prior electronic documents.

12. The computer-readable medium of claim 8, herein the one or more of the profiles comprises multiple ones of the profiles, and herein, to plan the workflow for the translation, the instructions are further to cause the processor to:

divide text of the current electronic document into a plurality of segments; and assign the segments to the multiple ones of the profiles to be translated in parallel.

13. The computer-readable medium of claim 12, wherein the division of the text of the current electronic document into the segments has a lower limit on a number of words in each of the segments.

14. A system comprising:

at least one memory that stores instructions and a plurality of previous translations of prior electronic documents for a plurality of profiles of translation professionals;

an interface to receive, from a client system, a request to translate current electronic document from a source language to a target language; and at least one processor configured to execute the instructions to:

extract a plurality of terms comprising words and patterns of words from the prior electronic documents;

generate a plurality of glossaries, wherein each glossary of the plurality of glossaries is associated with one of the plurality of profiles and includes a subset of terms from the plurality of terms, wherein the subset of terms was translated by the one of the plurality of profiles;

select one or more of the plurality of profiles based on a proximity of the subset of terms of a glossary associated with a respective profile of the plurality of profiles to extracted terms of the current electronic document;

evaluate qualities of the previous translations of the prior electronic documents for each of the selected one or more of the profiles;

plan a workflow for translation of the current electronic document based on the selected one or more of the profiles; and cause the current electronic document to be translated according to the planned workflow.

15. The system of claim 14, wherein the processor is further configured to execute the instructions to:

generate a prior terminology frequency vector associated with one of the plurality of glossaries wherein the prior terminology frequency vector comprises frequency information of the subset of terms of the one of the plurality of glossaries;

generate a current terminology frequency vector that comprises frequency information of extracted terms of the current electronic document; and compare the current terminology frequency vector with the prior terminology frequency vector associated with the one of the plurality of glossaries.

16. The system of claim 14, wherein, to select the one or more of the profiles, the processor is further configured to execute the instructions to:

classify each of the prior electronic documents translated by each of the profiles as being in one or more subject areas among a plurality of subject areas based on the plurality of terms extracted from the prior electronic documents;

classify the current electronic document as being in a subject area among the plurality of subject areas based on the terms extracted from the current electronic document; and compare the subject area of the current electronic document with the subject areas of the prior electronic documents to determine the proximity and that the one or more of the profiles are experienced in the subject area.

17. The system of claim 16, wherein, to classify, the processor is further configured to execute the instructions to automatically classify based on machine learning clustering of the terms extracted from the current electronic document and the plurality of terms extracted from the prior electronic documents.

18. The system of claim 14, herein the one or more of the profiles comprises multiple ones of the profiles, and wherein, to plan the workflow for the translation, the processor is further configured to execute the instructions to:

divide text of the current electronic document into a plurality of segments; and assign the segments to the multiple ones of the profiles to be translated in parallel.

19. The system of claim 18, wherein the division of the text of the current electronic document into the segments has a lower limit on a number of words in each of the segments.

20. The system of claim 14, wherein the one or more of the profiles comprise multiple ones of the profiles, wherein the translation comprises a plurality of stages, and wherein, to plan the workflow of the translation, the processor is further configured to execute the instructions to assign the stages to the multiple ones of the profiles based on requirements, from the client system, for the translation.

* * * * *